United States Patent
Shiva et al.

(10) Patent No.: US 9,141,791 B2
(45) Date of Patent: Sep. 22, 2015

(54) MONITORING FOR ANOMALIES IN A COMPUTING ENVIRONMENT

(71) Applicant: HEWLETT-PACKARD DEVELOPMENT COMPANY, L.P., Houston, TX (US)

(72) Inventors: SM Prakash Shiva, Bangalore Karnataka (IN); Siva Raj Rajagopalan, Morris Plains, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 61 days.

(21) Appl. No.: 13/680,731

(22) Filed: Nov. 19, 2012

(65) Prior Publication Data

US 2014/0143868 A1    May 22, 2014

(51) Int. Cl.
  *G06F 21/55*    (2013.01)
  *G06F 11/00*    (2006.01)
  *H04L 29/06*    (2006.01)

(52) U.S. Cl.
  CPC .............. *G06F 21/552* (2013.01); *H04L 63/14* (2013.01)

(58) Field of Classification Search
  CPC ..... G06F 21/55; G06F 21/552; G06F 21/554; H04L 63/14; H04L 63/1408; H04L 63/1416; H04L 63/1425
  USPC .......................................................... 726/23
  See application file for complete search history.

(56) References Cited

U.S. PATENT DOCUMENTS

| | | | |
|---|---|---|---|
| 7,475,405 B2 | 1/2009 | Manganaris et al. | |
| 7,913,303 B1* | 3/2011 | Rouland et al. | 726/23 |
| 7,917,393 B2 | 3/2011 | Valdes et al. | |
| 7,930,746 B1 | 4/2011 | Sheleheda et al. | |
| 8,224,761 B1* | 7/2012 | Rockwood | 706/47 |
| 2002/0032717 A1* | 3/2002 | Malan et al. | 709/105 |
| 2003/0097439 A1* | 5/2003 | Strayer et al. | 709/224 |
| 2003/0097588 A1* | 5/2003 | Fischman et al. | 713/200 |
| 2004/0015719 A1* | 1/2004 | Lee et al. | 713/201 |
| 2004/0193943 A1* | 9/2004 | Angelino et al. | 714/4 |
| 2005/0193430 A1* | 9/2005 | Cohen et al. | 726/25 |
| 2005/0249214 A1* | 11/2005 | Peng | 370/392 |
| 2006/0095968 A1* | 5/2006 | Portolani et al. | 726/23 |
| 2007/0226796 A1* | 9/2007 | Gilbert et al. | 726/22 |
| 2010/0071024 A1* | 3/2010 | Eyada | 726/1 |
| 2010/0153316 A1* | 6/2010 | Duffield et al. | 706/12 |
| 2011/0016525 A1* | 1/2011 | Jeong et al. | 726/23 |
| 2011/0185422 A1* | 7/2011 | Khayam et al. | 726/23 |
| 2012/0233311 A1* | 9/2012 | Parker et al. | 709/224 |
| 2013/0247203 A1* | 9/2013 | Nakawatase et al. | 726/25 |
| 2014/0082730 A1* | 3/2014 | Vashist et al. | 726/23 |

OTHER PUBLICATIONS

Grandison, Tyrone, et al.; "Intrusion Detection Technology"; Sep. 7, 2007.

(Continued)

*Primary Examiner* — Darren B Schwartz
(74) *Attorney, Agent, or Firm* — Van Cott, Bagley, Cornwall & McCarthy

(57) ABSTRACT

A method of monitoring for anomalies in a computing environment comprises, with a processor building an anomaly detection system based on topology guided statistical analysis, and creating a number of correlation rules based on a number of detected anomalies and information provided by a security alerts database.

10 Claims, 5 Drawing Sheets

(56) References Cited

OTHER PUBLICATIONS

Rice, G.W. et al.; "A Hierarchical Approach for Detecting System Intrusions Through Event Correlation"; retrieved on Nov. 19, 2012; http://citeseerx.ist.psu.edu/viewdoc/summary?doi=10.1.1.84.3934.

Youssef, A. et al.; "Network Intrusion Detection Using Data Mining and Network Behaviour Analysis"; Dec. 2011; vol. 3; Issue 6; http://airccse.org/journal/jcsit/1211csit07.pdf.

Zhao, D. et al.; "Analysis and Design for Intrusion Detection System Based on Data Mining"; Mar. 6-7, 2010; pp. 339-342; vol. 2; http://ieeexplore.ieee.org/stamp/stamp.jsp?arnumber=5459845.

Zhao, D. et al.; "Research and Design for Intrusion Detection System with Hybrid Detector and Apriori Algorithm"; May 22-23, 2010; pp. 1-4; http://ieeexplore.ieee.org/stamp/stamp.jsp?arnumber=5473646.

* cited by examiner

US 9,141,791 B2

MONITORING FOR ANOMALIES IN A COMPUTING ENVIRONMENT

BACKGROUND

Due to the increase in traffic encountered within networks such as the Internet, malicious activities and policy violations associated with these networks has also increased. Often, a business entity selling goods or services via the Internet may be inundated by these malicious activities and policy violations. In order to combat these malicious activities and policy violations, several approaches have been taken to detect such intrusions. One approach is through correlating alerts from different sources. A second approach is through detecting anomalous behavior in one or more aspects of system performance. However, neither of these approaches will provide 100% detection.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
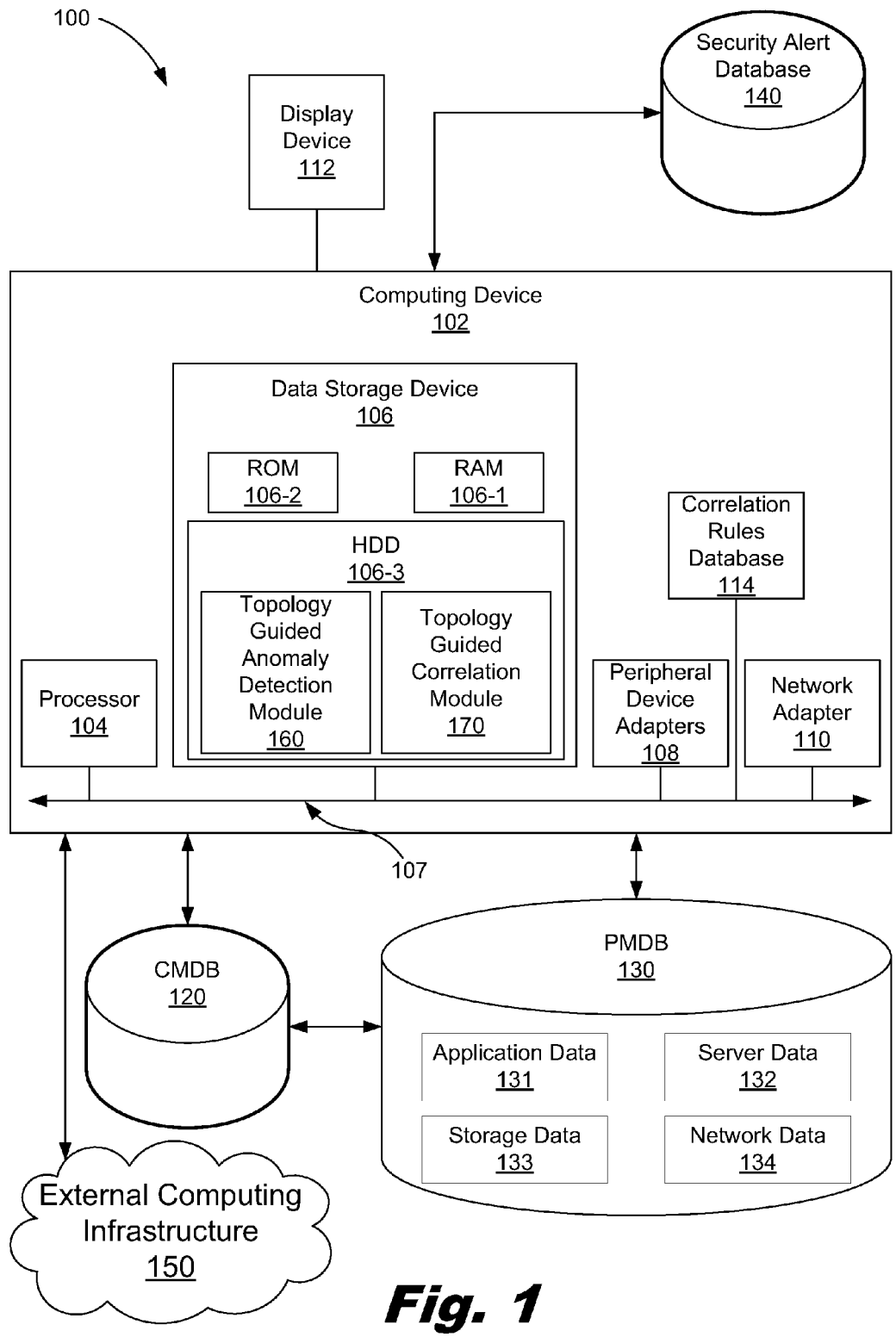
FIG. 1 is a diagram of a hybrid intrusion detection system (IDS) creation and execution system, according to one example of the principles described herein.

The present systems and methods describe a Hybrid intrusion detection system (Hybrid IDS) for use in detecting attempts or successful attacks on monitored resources that are part of the network environment. A method of monitoring for anomalies in a computing environment comprises, with a processor, building an anomaly detection system based on topology guided statistical analysis, and creating a number of correlation rules based on a number of detected anomalies and information provided by a security alerts database.

A hybrid intrusion detection system (IDS) may comprise a configuration management database to store data regarding a number of configuration items within the networking environment, a performance management database to store data related to resource usage metrics, a security alert database to store data associated with a number of security alerts, and a computing device. The computing device comprises a processor, and a data storage device to store a topology guided anomaly detection module that, when executed by the processor, detects a number of anomalies using topology guided statistical analysis, and a topology guided correlation module that, when executed by the processor, creates a number of correlation rules based on a number of flagged anomalies and the information provided by the security alerts database.

A computer program product for monitoring for anomalies in a computing environment, the computer program product may comprise a computer readable storage medium comprising computer usable program code embodied therewith, the computer usable program code comprising computer usable program code to, when executed by a processor, store transaction and performance data enriched by topology data within a performance management database, and computer usable program code to, when executed by a processor, identify a number of metrics for each of a number of configuration items in the topology of a web application.

An intrusion detection system (IDS) is a hardware device or a combination of hardware and software that monitors network or system activities for malicious activities or policy violations. In one example, the IDS may produce reports for or provide alerts to a management device that is utilized by an administrator of the network or system. IDS may also be used to stop an intrusion attempt, identify possible incidents, and log information about those incidents. Further, IDS may also be used to identify problems with security policies, document existing threats, and deter individuals from violating security policies. A host-based intrusion detection system (HIDS) is a type of IDS that monitors and analyzes the internals of a single computing system which may be composed of one or several individual computers working together, and network packets received at that computing system's network interfaces.

There are two approaches to detect intrusion for host-based intrusion detection system (HIDS). One is through correlating alerts from different sources that monitor the system and produce alerts. The second is through detecting anomalous behavior in one or more aspects of system performance. In anomaly detection, a computing system defines and characterizes legitimate behaviors of the users, and then detects anomalous behaviors by quantifying deviations from the defined legitimate behaviors. Identifying the distance between anomalous and legitimate behaviors that would correctly classify a given behavior is difficult to quantify. Neither of these intrusion detection approaches provides 100% detection of intrusions within the computing system or environment.

The present systems and methods build and deploy an efficient topology guided, hybrid Intrusion Detection System (hybrid IDS). The hybrid IDS takes advantage of application-layer topology information of business services, business application/composite application available in CMDB. In this approach we will correlate the application transaction, application resource usage, host resource usage, storage resource usage and network resource usage to detect anomalies with higher reliability and we will correlate this with security based alerts guided by topology to increase the reliability and detection rate of Intrusion Detection System (IDS)

As used in the present specification and in the appended claims, the terms "configuration management database" or "CMDB" are meant to be understood broadly as any database that stores information regarding the state and relevant properties of a number of components of a networking environment and the computing devices or systems making up the networking environment. In one example, the CMDB contains details of a number of configuration items (CI) in the information technology (IT) infrastructure or network environment. In one example, the CMDB records CIs and details about the attributes and relationships between CIs.

Further, as used in the present specification and in the appended claims, the terms "configuration item" or "CI" are meant to be understood broadly as any component of an IT infrastructure that is under the control of configuration management. Examples of CIs include devices within an IT infrastructure, computing topology, or network environment, transaction that occur within the network environment, individual requirements documents, applications, software, models, and plans. For example, a CI may describe a host computer, applications, servers connected to the host computer, virtual machines connected to the host computer, network devices connected to the host computer, and transactions that occur between the above, among others.

Further, as used in the present specification and in the appended claims, the terms "performance management database" or "PMDB" are meant to be understood broadly as any database that stores information regarding performance data of a number of components of a networking environment and the computing devices or systems making up the networking environment. In one example, the PMDB contains data detailing the performance of a number of configuration items (CI). In another example, the PMDB contains data detailing the performance of applications executing within the networking environment, storage devices operating within the networking environment, servers operating within the networking environment, and the network that makes up the networking environment. The PMDB also stores data regarding business and application transaction data that is communicated within the networking environment. In one example, the PMDB is a centralized database.

Further, as used in the present specification and in the appended claims, the terms "intrusion detection system" or "IDS" are meant to be understood broadly as any hardware or combination of hardware and software that detects attempts or successful attacks on monitored resources that are part of the network environment.

Further, as used in the present specification and in the appended claims, the term "anomaly" or similar language is meant to be understood broadly as any odd, peculiar, or strange condition or situation that may exists within a computing environment, system, or device. For example, an anomaly may be an incongruity or inconsistency of patterns within a given data set that do not conform to an established normal behavior within the computing environment, system, or device. The patterns of anomalies may translate into critical and actionable information in several application domains. Anomalies may also be referred to in the art as outliers, change, deviation, peculiarity, or an intrusion, among others. Examples of anomalous behavior within a computing environment, system, or device may include a number of unsuccessful logins to a web service, or an unexpectedly high CPU utilization, a number of database transactions without a corresponding number of web application level transactions, among many others.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a hybrid intrusion detection system (IDS) creation and execution system (100), according to one example of the principles described herein. In one example, the system (100) is a computing device that performs the methods described herein within a networking environment. In this example, the networking environment may be a network of a number of computers, an internet, an intranet, or the Internet. The networking environment may also comprise a cloud network environment including, for example, a private cloud network, a public cloud network, or a hybrid cloud network, among others. In another example, the networking environment may be a mobile network environment. In still another example, the networking environment may be a virtualized network environment.

In one example, the system (100) may be embodied within and executable on, for example, a mobile computing device such as, for example, a mobile phone, smart phone, personal digital assistant (PDA), or a laptop computer with the capability of performing the methods described herein. In another example, the system (100) may be embodied within and executable on a desktop computing environment, among other computing devices. The system (100) may comprise a number of components including a computing device (102), a configuration management database (CMDB) (120), a performance management database (PMDB) (130), a security alert database (140), and an external computing infrastructure (150).

To achieve its desired functionality, the computing device (102) comprises various hardware components. Among these hardware components may be at least one processor (104), at least one data storage device (106), peripheral device adapters (108), and a network adapter (110). These hardware components may be interconnected through the use of a number of busses and/or network connections. In one example, the processor (104), data storage device (106), peripheral device adapters (108), and a network adapter (110) may be communicatively coupled via bus (107).

The processor (104) may include the hardware architecture that retrieves executable code from the data storage device (106) and execute the executable code. The executable code may, when executed by the processor (104), cause the processor (104) to implement at least the functionality of building a topology-guided hybrid IDS and executing the functionality of the hybrid IDS according to the methods of the present specification described below. In the course of executing code, the processor (104) may receive input from and provide output to a number of the remaining hardware units described herein.

The data storage device (106) may store data such as executable program code that is executed by the processor (104) or other processing device. As will be discussed, the data storage device (106) may specifically store a number of applications that the processor (104) executes to implement at least the functionality of building a topology-guided hybrid IDS and executing the functionality of the hybrid IDS.

The data storage device (106) may include various types of memory modules, including volatile and nonvolatile memory. For example, the data storage device (106) of the present example includes Random Access Memory (RAM) (106-1), Read Only Memory (ROM) (106-2), and Hard Disk Drive (HDD) memory (106-3). Many other types of memory are available in the art, and the present specification contemplates the use of many varying type(s) of memory in the data storage device (106) as may suit a particular application of the principles described herein. In certain examples, different types of memory in the data storage device (106) may be used for different data storage needs. For example, in certain examples the processor (104) may boot from Read Only Memory (ROM) (106-2), maintain nonvolatile storage in the Hard Disk Drive (HDD) memory (106-3), and execute program code stored in Random Access Memory (RAM) (106-1).

Generally, the data storage device (106) may comprise a computer readable storage medium. For example, the data storage device (106) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The hardware adapters (108, 110) in the computing device (102) enable the processor (104) to interface with various other hardware elements, external and internal to the computing device (102). For example, peripheral device adapters (108) may provide an interface to input/output devices, such as, for example, display device (112), to create a user interface and/or access external devices such as, for example, the CMDB (120), the PMDB (130), and security alert database (140). As will be discussed below, a number of output devices to interact with and implement the functionality of the computing device (102).

Peripheral device adapters (108) may also create an interface between the processor (104) and a printer, the display device (112), or other media output device. The network adapter (110) may provide an interface to a number of other computing devices or networks included within the networking environment, thereby enabling the transmission of data between the computing device (102), and other devices such as, for example, the CMDB (120), the PMDB (130), security alert database (140), servers, devices within the external computing infrastructure, or other computing devices. The external computing infrastructure (150) as depicted in FIG. 1 may be any number of computing devices to which the computing device (102) is communicatively coupled. In one example, the external computing infrastructure (150) comprises computing devices that are to be monitored for anomalous behavior such as malicious activities and policy violations. In another example, anomalous behavior may be monitored within the computing device (102) as well as those devices located within the external computing infrastructure (150).

The hybrid IDS creation and execution system (100) of FIG. 1 further comprises the configuration management database (CMDB) (120). The CMDB (120) is any database that stores information regarding a number of components of a networking environment and the computing devices or systems making up the networking environment. In one example, the CMDB contains details of a number of configuration items (CI) in the information technology (IT) infrastructure or network environment. In one example, the CMDB records CIs and details about the attributes and relationships between CIs. A CMDB assists a user in understanding the relationships between components within the networking environment and tracks the configuration of these components.

As described above, CIs are any component of an IT infrastructure that is under the control of configuration management. Examples of CIs include devices within an IT infrastructure, computing topology, or network environment, individual requirements documents, applications, software, models, and plans. For example, a CI may be a host computer, applications, servers connected to the host computer, virtual machines connected to the host computer, and network devices connected to the host computer, among others.

The hybrid IDS creation and execution system (100) of FIG. 1 further comprises the performance management database (PMDB) (130). As described above, the PMDB (130) is any database that stores information regarding performance data of a number of components of a networking environment and the computing devices or systems making up the networking environment. In one example, the PMDB may store data detailing the performance of applications executing within the networking environment, storage devices operating within the networking environment, servers operating within the networking environment, and the network that makes up the networking environment. Further, the PMDB (130) may store data regarding business and application transaction data that is communicated within the networking environment. Still further, the PMDB (130) may store data related to resource usage metrics associated with the usage of applications or networks within the system (100), or usage of devices within the system (100) such as servers, networking devices, and storage devices, among others. Thus, the PMDB (130) stores data regarding usage of devices within the system (100), transactions within the system (100), and performance of devices within the system (100).

In the example of FIG. 1, the PMDB (130) comprises application data (131), server data (132), storage data (133), and network data (134). The application data (131) is data regarding the performance of a number of applications running within the system (100), applications running on the computing device (102), and applications running on computing devices within the external computing infrastructure (150). The application data (131) may include data associated with a number of business transactions or application transactions performed within the system (100), the computing device (102), and external computing infrastructure (150). The application data (131) may also comprise data regarding the usage of application resources within the system (100).

The server data (132) is data regarding the performance of a number of servers within the system (100), the computing device (102), and the external computing infrastructure (150). The server data (132) may also comprise data regarding a number of business transactions or application transactions that occur on a number of servers.

The storage data (133) comprises data regarding the performance of a number of data storage devices within the system (100), the computing device (102), and the external computing infrastructure (150). In one example, the storage data (133) may comprise data regarding the performance of the data storage device (106) located within the computing device (102). In another example, the storage data (133) may comprise data regarding the performance of data storage devices located within the external computing infrastructure (150). In still another example, the storage data (133) may comprise data regarding the performance of the CMDB (120), the PMDB (130), or the security alert database (140). The network data (134) comprises data regarding the performance of a number of network devices and network connections between those network devices located within the system (100) or the external computing infrastructure (150).

Transaction data within the application data (131), server data (132), storage data (133), and network data (134) may be any data regarding data transactions. This transaction data may be provided to the PMDB (130) by software products such as, for example, DIAGNOSTICS software products developed and sold by Hewlett-Packard Company. Application performance data may be provided to the PMDB (130) by software products such as OPERATIONS SMART PLUG-INS (OM SPIs) or SITESCOPE® also developed and sold by Hewlett-Packard Company.

The hybrid IDS creation and execution system (100) of FIG. 1 further comprises the security alert database (140). The security alert database (140) is any database that contains data associated with a number of security alerts. In one example, the security alert database is part of or provided by security management software product such as, for example, ARCSIGHT™ developed and sold by Hewlett-Packard Company. In this example, any number of security management software products may be used as a source for security alerts within the security alert database (140).

Turning again to the computing device (102) of FIG. 1, the data storage device (106) may store a topology guided anomaly detection module (160) and a topology guided correlation module (170). In one example, the topology guided anomaly detection module (160) and topology guided correlation module (170) may be stored in the HDD (106-3) as depicted in FIG. 1. However, any data storage device may be used to store these modules. The topology guided anomaly detection module (160), when executed by the processor (104), detects a number of anomalies using topology guided statistical analysis such as, for example, multivariate correlations between transactions, applications, systems, and network resources usage metrics available via the PMDB (130). For example, an abnormal number of database transactions that occur in connection with a business application transactions and composite application transactions that take place on an application server may be detected that are relatively higher than a normal or expected number of database transactions.

The processor may then determine if a detected anomaly is a symptom of an intrusion within the system (100). For example, the processor (104) may determine if the database transactions are supported by appropriate lower layer events such as, for example, file access and network traffic. If the database transactions are not supported by appropriate lower layer events, then the processor (104) flags that detected anomaly as possibly malicious.

The processor (104) then creates a number of correlation rules via the topology guided correlation module (170). The correlation rules may be stored, for example, within a correlation rules database (114). In the example of FIG. 1, the correlation rules database (114) is located within the computing device (102). However, the correlation rules database (114) may be located anywhere within the system. The processor (104) may then access the correlation rules database (114) for application of the correlation rules within the system (100), the computing device (102), and the external computing infrastructure (150).

The topology guided correlation module (170) creates correlation rules by the combining or correlating the data stored within the PMDB (130), anomalies detected using that data stored in the PMDB (130), and the data associated with a number of security alerts stored within the security alert database (140). The processor (104) stores a number of correlation rules in the correlation rules database (114). Application of the correlation rules within the system (100), computing device (102), and external computing infrastructure (150) will detect anomalous behavior at the application layer such as, for example, abnormal database transactions, and suspicious activity at a lower layer such as, for example, traffic between a database and an unknown or suspicious IP address. When such a detection occurs, the anomaly will be classified as an intrusion, and action may be taken to stop the intrusion, create a report or log of the intrusion, identify problems with security policies, document existing threats, deter individuals from violating security policies, determine business and technical impacts of the intrusion, or a combination thereof.

Figure 2:
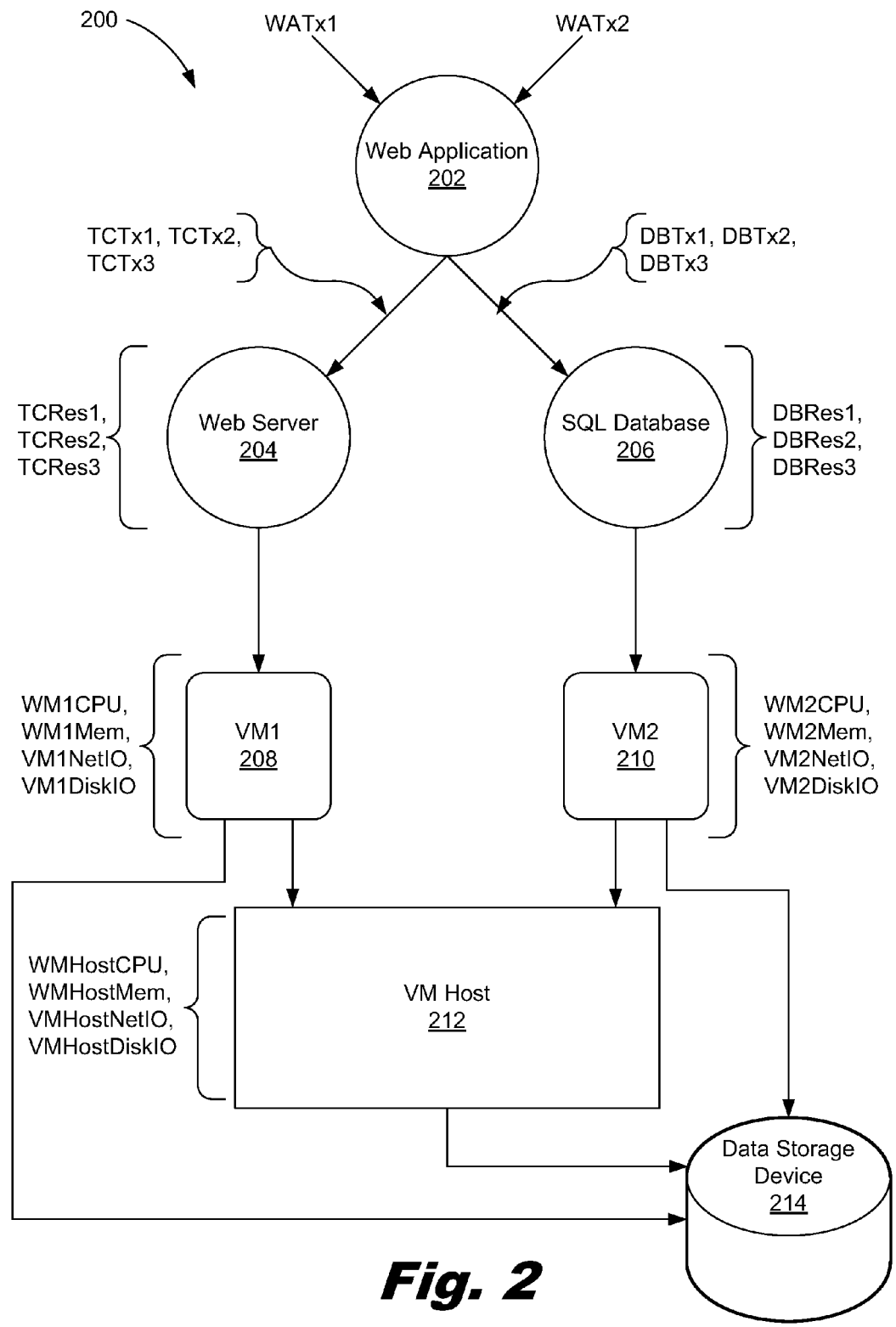
FIG. 2 is a diagram of the topology of a web application, according to one example of the principles described herein.

FIG. 2 is a diagram of the topology (200) of a web application (202), according to one example of the principles described herein. The topology (200) is merely an example. Different web applications may comprise different topologies, and the topology (200) of FIG. 2, is merely an example. The topology (200) may comprise a web application (202). The web application (202) may be any application that is accessed by users over a network such as the Internet or an intranet via, for example, the network adaptor (110) to networked devices within the hybrid IDS creation and execution system (100) and external computing infrastructure (150), and other sub-computing devices within the computing device (102). Examples of web applications include webmail, online retail sales, online auctions, and wikis, among many other functions. Any number of applications making up the application layer of the system (100) may exists within the topology (200), but only web application (202) is depicted in FIG. 2.

The example topology (200) of FIG. 2 further comprises a web server (204) and a structured query language (SQL) database (206). In one example, the web server (204) is a TOMCAT web server produced and sold by apache Software Foundation. However, the web server (204) may be any web server. The example topology (200) of FIG. 2 further comprises a first virtual machine (VM) (208) and a second virtual machine (VM) (210) coupled to the web server (204) and SQL database (206), respectively. The first VM (208) and second VM (210) are further hosted on a VM Host (212). The first VM (208), second VM (210), and VM Host (212) are coupled to a data storage device (214) where data regarding the transactions that occur within the topology (200) between the web application (202), web server (204), SQL database (206), first VM (208), second VM (210), and VM Host (212) are stored. This data, as described above, may include data associated with application transactions, usage data of the various devices within the topology (200), and performance of devices within the topology (200). In one example, the data storage device (214) of FIG. 2 is the CMDB (120) or PMDB (130) of FIG. 1.

An example of a series of transactions that may take place within the topology (200) of FIG. 2 is a user login transaction. In this example, depicted in FIG. 2, the user login transaction may comprise a number of initial web application level transactions; WATx1 and WATx2. In this example, the web application (202) is a business application, and the web application level transactions are business application level transactions. For example, a user may be logging into a web service provided by a third party such as Amazon.com using a username and password in order to purchase an item and have that item delivered, thus completing a business transaction. When the web application (202) receives the web application level transactions (WATx1, WATx2), a number of additional transactions take place by providing that data to the web server (204) (TCTx1, TCTx2, TCTx3) and the SQL database (206) (DBTx1, DBTx2, DBTx3). Thus, a number of transactions may take place at and between the various topology layers within the example topology (200) of FIG. 2. As shown in FIG. 2, these transactions may comprise, for example, data transfers (WATx1, WATx2, TCTx1, TCTx2, TCTx3, DBTx1, DBTx2, DBTx3). Further, the transactions may comprise usage of a number of application resources (e.g., TomCat (TCRes1, TCRes2, TCRes3) such as, for example, thread pools, and servlets, among others. Still further, the transactions may comprise database resources (DBRes1, DBRes2, DBRes3), such as database primary caches, database space, and connection pools, among others. Even still further, the transactions may comprise a number of CPU (VM1 CPU, VM2CPU, VMHostCPU), a number of memory (VM1Mem, VM2Mem, VMHostMem), a number of network I/O transfers (VM1NetIO, VM2NetIO, VMHostNetIO), and a number of disk I/O transfers (VM1DiskIO, VM2DiskIO, VMHostDiskIO). All of the transactions depicted within FIG. 2 or any other similar topology may be considered CIs, and data related to these transactions are stored within the data storage device (214). The functions performed by the above-described computing environment will now be described in connection with FIGS. 3 through 5.

Figure 3:
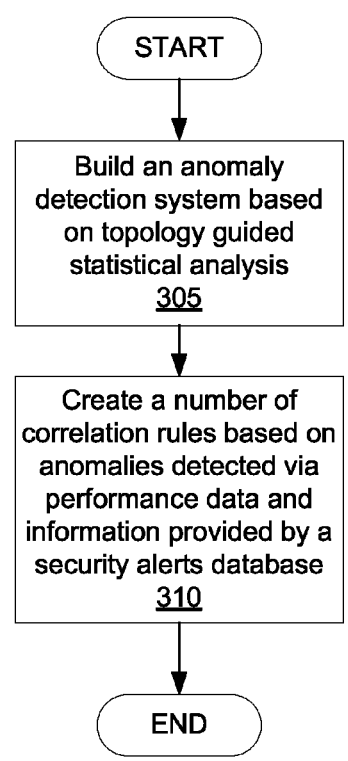
FIG. 3 is a flowchart showing a hybrid IDS creation method, according to one example of the principles described herein.

FIG. 3 is a flowchart (300) showing a hybrid IDS creation method, according to one example of the principles described herein. The method of FIG. 3 may begin by building (block 305) an anomaly detection system based on topology guided statistical analysis. The processor (104) or other processing device may execute code in building (block 305) the anomaly detection system. As will be described in more detail below, baseline metrics of a number of CIs within the hybrid IDS creation and execution system (100), baseline relationships between the metrics of the same or a number of different CIs, topologies of a number of web applications, multivariate correlations between transactions, applications, systems, and network resource usage metrics available in the PMDB (130), and a combination thereof may be used to build (block 305) the anomaly detection system.

The processor (104) creates (block 310) a number of correlation rules based on a number of detected anomalies and information provided by the security alerts database (140). Again, as will be described in more detail below, a number of security alerts stored within the security alerts database (140) are correlated with the a number of detected anomalies to create (block 310) the correlation rules.

Figure 4:
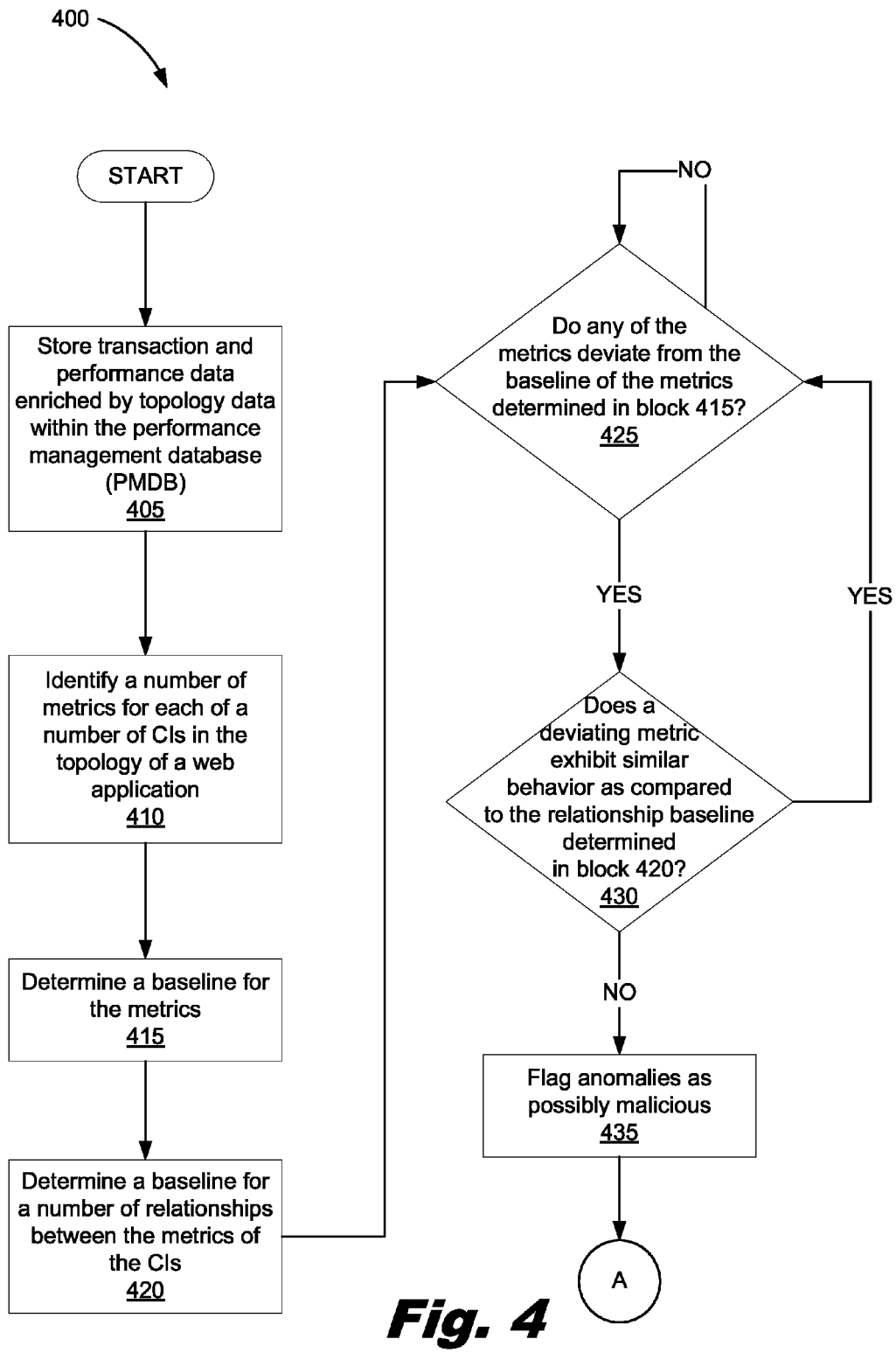
FIGS. 4 and 5 comprise a flowchart showing a hybrid IDS creation and implementation method, according to one example of the principles described herein.
Figure 5:
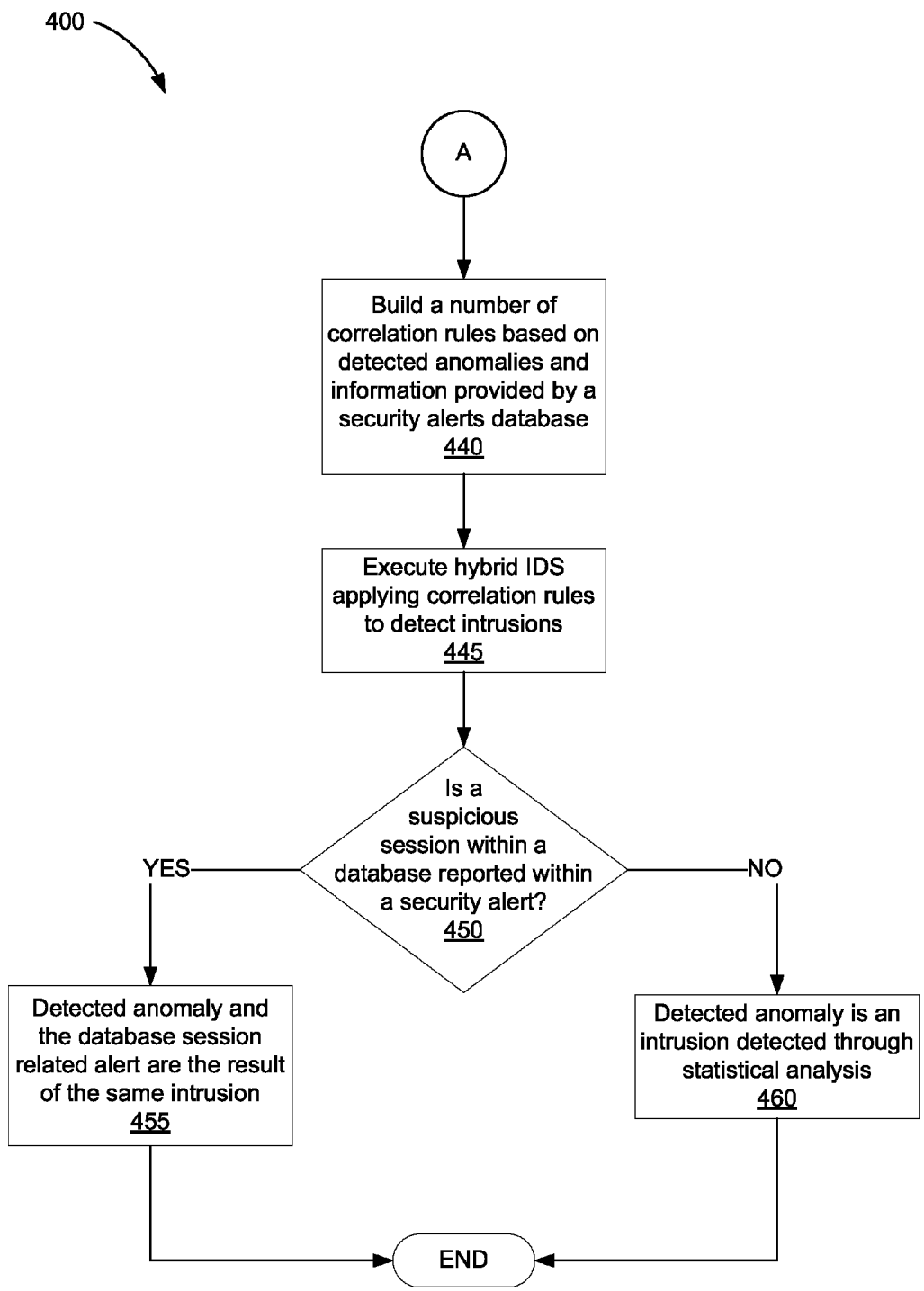

FIGS. 4 and 5 comprise a flowchart (400) showing a hybrid IDS creation and implementation method, according to one example of the principles described herein. The method (400) may begin with the processor (104) storing (block 405) transaction and performance data enriched by topology data within the PMDB (FIG. 1, 130). As described above, the PMDB (FIG. 1, 130) stores performance data of a number of components of a networking environment and the computing devices or systems making up the networking environment, business and application transaction data that is communicated within the networking environment, and resource usage metrics associated with the usage of applications or networks within the system (100), or usage of devices within the system (100) such as servers, networking devices, and storage devices, among others. This data is correlated and enriched with data regarding the topology (FIG. 2, 200) of the web application (FIG. 2, 202) in which potential intrusions or anomalies may take place.

The processor (FIG. 1, 104) identifies (block 410) a number of metrics for each of a number of CIs in the topology of a web application. A baseline for the metrics is determined (block 415). The baseline provides a benchmark or standard as to what type and number of transactions are expected to take place within the topology (FIG. 2, 200). An example of some metrics may be those shown within FIG. 2, and include, for example WATx1, WATx2, TCTx1, TCTx2, TCTx3, DBTx1, DBTx2, DBTx3, TCRes1, TCRes2, TCRes3, DBRes1, DBRes2, DBRes3, VM1CPU, VM2CPU, VMHostCPU, VM1Mem, VM2Mem, VMHostMem, VM1NetIO, VM2NetIO, VMHostNetIO, VM1 DiskIO, VM2DiskIO, and VMHostDiskIO, among others based on the web application utilized within the system (100).

The processor (104) determines (block 420) a baseline for a number of relationships between the metrics of the CIs. Thus, a number of relationships may be defined between metrics of the same CI or among a number of different CIs. These relationships may be defined mathematically. For example, a relationship between the metric "BATx1" shown in FIG. 2 with other metrics may be expressed as $BATx1=f1(TCTx1)+f2(DBTx1)+f3(VM1CPU)$. Another example may be where the relationship between the metric "DBTx1" and other metrics is expressed as $DBTx1=f1(TCTx1)+f2(BATx1)+f3(VM1CPU)$. Thus, a metric may be defined as a function of other metrics within the topology (FIG. 2, 200).

The processor (104) then determines if any of the metrics deviate from the baseline of the metrics determined in block 415 (block 425). If none of the metrics deviate from the baseline or known behaviors, states, or values of the metrics determined in block 415 (block 425, determination NO), then the processor loops continually in order to make such a determination as long as is necessary to detect intrusions within the system (100). If a number of the metrics deviate from the baseline of the metrics determined in block 415 (Block 425, determination YES), then the processor (104) determines if a deviating metric exhibits similar behavior as compared to the relationship baseline determined in block 420 (block 430).

If the processor (104) determines that a deviating metric exhibits similar behavior as compared to the relationship baseline determined in block 420 (block 430, determination YES), then the method loops back to block 425 in order to continually detect intrusions within the system (100). If the processor (104) determines that a deviating metric does not exhibit similar behavior as compared to the relationship baseline determined in block 420 (block 430, determination NO), then the processor (104) flags those anomalies as possibly malicious.

The processor (FIG. 1, 104) builds (block 440) a number of correlation rules based on the detected anomalies and information provided by the security alerts database (FIG. 1, 140). The processor (FIG. 1, 104) executes (block 445) the hybrid IDS and applies the correlation rules to detect intrusions. The system (100) determines (block 450) if a suspicious session within a database is reported in a security alert. If a suspicious session within a database is reported in a security alert (block 450, determination YES), then the detected anomaly and the database session related alert are the result of the same intrusion (block 455). If a suspicious session within a database is not reported in a security alert (block 450, determination NO), then the detected anomaly is an intrusion detected through statistical analysis.

The methods of FIGS. 3, 4, and 5 may be followed by addressing the intrusion via the hybrid IDS creation and execution system (100). For example, the system (100), using the above methods, may further produce reports for or provide alerts to a management device that is utilized by an administrator of the network or system (100), stop an intrusion attempt, identify possible incidents, log information about those incidents, identify problems with security policies, document existing threats, deter individuals from violating security policies, assess business and technical impact of the intrusion, or a combination thereof.

In one example, the above methods may be employed within the computing device (102) to detect anomalies therein. In another example, the above methods may be executed by the computing device (102) to detect anomalies that may occur within a device other than the computing device (102) such as other computing devices that operate within the network environment in which the computing device (102) is implemented. These other computing devices may include, for example, servers, appliances, tablets, the CMDB (120), the PMDB (130), the security alert database (140), and computing devices within the external computing infrastructure (150), among others.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (104) of the computing device (102) or other programmable data processing apparatus, implement the functions or acts specified in the flowchart and/or block diagram block or blocks. In one example, the computer usable program code may be embodied within a computer readable storage medium; the computer readable storage medium being part of the computer program product. In another example, the computer usable program code may be embodied in a non-transitory computer readable medium such as, for example a non-transitory computer readable storage medium. Examples of non-transitory computer readable medium may include an electronic, magnetic, optical, electromagnetic, infrared, or semiconductor system, apparatus, or device, or any suitable combination of the foregoing.

The specification and figures describe a method and system for monitoring for anomalies in a computing environment. The method comprises building an anomaly detection system based on topology guided statistical analysis, and creating a number of correlation rules based on a number of detected anomalies and information provided by a security alerts database. This method and system for monitoring for anomalies in a computing environment may have a number of advantages, including: (1) taking holistic approach for intrusion detection by analyzing the transaction, resource usage, and alerts information collected from servers, storage device, applications, and the network; (2) takes advantage of the topology information available in the CMDB (120) to improve the efficiency and accuracy of anomaly detection through a statistical method.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of monitoring for anomalies in a computing environment comprising:
    by a processor, building an anomaly detection system based on topology guided statistical analysis, comprising:
        by the processor executing a monitoring application, determining transaction and performance data of a number of configuration items in a topology of a web application executed within the computing environment correlated with data associated with the topology of the web application; and
        by the processor, identifying a number of metrics for each of the configuration items; and
        by the processor, storing, in a performance management database (PMDB), the transaction and performance data of the configuration items, correlated data associated with the topology of the web application, and the metrics of the configuration items;
        by the processor, determining if a first metric of the number of metrics deviates from a metric baseline;
        by the processor, responsive to a determination that the first metric deviates from the metric baseline, flagging the first metric as a potential malicious anomaly;
    by the processor, creating a number of correlation rules to detect a number of intrusions, the correlation rules based on the transaction and performance data of the configuration items, correlated data associated with the topology of the web application, the metrics of the configuration items, the flagged anomaly, and information provided by a security alerts database, the security alert database comprising stored data regarding security alerts reported from a security management software product;
    by the processor, applying the correlation rules to detect the intrusions in the computing environment;
    by the processor, determining if a suspicious session is reported within the security alerts stored in the security alert database;
    by the processor, responsive to a determination that the suspicious session is reported within the security alerts stored in the security alert database, classifying the flagged anomaly as a first intrusion in the computing environment and classifying the suspicious session as the first intrusion; and
    by the processor, responsive to a determination that the suspicious session is not reported within the security alerts stored in the security alert database, classifying the flagged anomaly as an intrusion in the computing environment detected through statistical analysis.

2. The method of claim 1, further comprising, by the processor, determining the metric baseline for the metrics.

3. The method of claim 2, in which determining if any of the metrics deviate from a respective baseline comprises determining, by the processor, a relationship baseline for a number of relationships between the metrics of the configuration items.

4. The method of claim 1, in which the topology guided statistical analysis comprises multivariate correlations between transactions, applications, systems, and network usage metrics.

5. The method of claim 1, further comprising, by the processor, creating a report of the first intrusion.

6. The method of claim 1, in which building the anomaly detection system is based on at least one relationship between metrics.

7. The method of claim 1, in which each of the metrics are defined as a function of other metrics, comprising, by the processor:
    defining the baseline by a number of relationships between the metrics of the configuration items, in which the relationships between the metrics of the configuration items are defined mathematically, and wherein the first metric is defined as a function of a number of other metrics within the topology of the web application.

8. A hybrid intrusion detection system (IDS), comprising:
    a configuration management database to store data regarding a number of configuration items within a computing environment;
    a performance management database to store data related to a number of resource usage metrics;

a security alert database to store data associated with a number of security alerts reported from a security management software product; and a computing device comprising:
- a processor that implements computer-readable instructions stored in a data storage device to perform functionality that:
  - detects a number of anomalies using topology guided statistical analysis;
  - determines the resource usage metrics correlated with data associated with a topology of a web application, the resource usage metrics comprising transaction and performance data of the configuration items in the topology of the web application executed within the computing environment;
  - determines if a first resource usage metric of the number of resource usage metrics deviates from a metric baseline;
  - responsive to a determination that the first resource usage metric deviates from the metric baseline, flags the first resource usage metric as a potential malicious anomaly;
  - creates a number of correlation rules based on the resource usage metrics, correlated data associated with the topology of the web application, the data regarding the configuration items, the flagged anomaly, and the data associated with the number of security alerts provided by the security alerts database;
  - applies the correlation rules to detect intrusions within the computing device;
  - determines if a suspicious session is reported within the security alerts stored in the security alert database;
  - responsive to a determination that the suspicious session is reported within the security alerts stored in the security alert database, classifies the flagged anomaly as a first intrusion in the computing environment and classifies the suspicious session as the first intrusion; and
  - responsive to a determination that the suspicious session is not reported within the security alerts stored in the security alert database, classifies the flagged anomaly as an intrusion detected through statistical analysis.

9. The hybrid IDS of claim 8, further comprising a correlation rules database to store the correlation rules.

10. A computer program product for monitoring for anomalies in a computing environment, the computer program product comprising:
- a non-transitory computer readable storage medium comprising computer usable program code embodied therewith, the computer usable program code that, when executed by a processor, causes a computing device in the computing environment to:
  - identify a number of metrics for each of a number of configuration items in a topology of a web application executed within the computing environment;
  - determine a metric baseline for the metrics;
  - determine a relationship baseline for a number of relationships between the metrics of the configuration items;
  - determine if a first metric of the number of metrics deviates from the metric baseline;
  - responsive to a determination that the first metric deviates from the metric baseline,
  - flags the first metric as a potential malicious anomaly;
  - create a number of correlation rules based on transaction and performance data correlated with the topology data of the web, the metrics of the configuration items, the flagged anomaly, and security alert information provided by a security alerts database, the security alert database comprising stored data regarding security alerts reported from a security management software product;
  - apply the correlation rules to detect intrusions within the computing environment;
  - determine if a suspicious session is reported within the security alerts stored in a security alert database;
  - responsive to a determination that the suspicious session is reported within the security alerts stored in the security alert database, classify the flagged anomaly as a first intrusion in the computing environment and classify the suspicious session as the first intrusion; and
  - responsive to a determination that the suspicious session is not reported within the security alerts stored in the security alert database, classify the flagged anomaly as an intrusion in the computing environment detected through statistical analysis.

* * * * *